United States Patent
Albrecht

(10) Patent No.: US 10,955,437 B2
(45) Date of Patent: Mar. 23, 2021

(54) FREQUENCY MODULATION DETECTION FOR PHOTO INDUCED FORCE MICROSCOPY

(71) Applicant: MOLECULAR VISTA, INC., San Jose, CA (US)

(72) Inventor: Thomas R. Albrecht, San Jose, CA (US)

(73) Assignee: MOLECULAR VISTA, INC., San Jose, CA (US)

( * ) Notice: Subject to any disclaimer, the term of this patent is extended or adjusted under 35 U.S.C. 154(b) by 0 days.

(21) Appl. No.: 16/482,241

(22) PCT Filed: Jan. 30, 2018

(86) PCT No.: PCT/US2018/016050
§ 371 (c)(1),
(2) Date: Jul. 30, 2019

(87) PCT Pub. No.: WO2018/140982
PCT Pub. Date: Aug. 2, 2018

(65) Prior Publication Data
US 2020/0049735 A1 Feb. 13, 2020

Related U.S. Application Data

(60) Provisional application No. 62/452,307, filed on Jan. 30, 2017.

(51) Int. Cl.
*G01Q 60/34* (2010.01)
*G01Q 30/02* (2010.01)
*G01Q 30/18* (2010.01)
*G01Q 60/38* (2010.01)

(52) U.S. Cl.
CPC ............. *G01Q 60/34* (2013.01); *G01Q 30/02* (2013.01); *G01Q 30/18* (2013.01); *G01Q 60/38* (2013.01)

(58) Field of Classification Search
CPC ........ G01G 60/34; G01G 60/38; G01G 30/02; G01G 30/18
See application file for complete search history.

(56) References Cited

U.S. PATENT DOCUMENTS

| | | |
|---|---|---|
| 9,134,341 B2 | 9/2015 | Prater et al. |
| 2012/0079630 A1 | 3/2012 | Ginger et al. |
| 2012/0204296 A1 | 8/2012 | Prater et al. |
| 2014/0150139 A1 | 5/2014 | Moon |

OTHER PUBLICATIONS

International Search Report and Written Opinion for International Patent Application No. PCT/US2018/016050 dated Apr. 5, 2018, 7 pages.

(Continued)

*Primary Examiner* — Nicole M Ippolito
*Assistant Examiner* — Hanway Chang
(74) *Attorney, Agent, or Firm* — Loza & Loza, LLP; Thomas H. Ham

(57) ABSTRACT

An atomic force microscope and method for detecting photo-induced force using the atomic force microscope utilizes light from a photonic source at a tip-sample interface that results in photo-induced force gradient, which is detected by measuring a resonant frequency of a vibrational mode of a cantilever of the atomic force microscope.

18 Claims, 3 Drawing Sheets

(56) References Cited

OTHER PUBLICATIONS

Zerweck, Ulrich et al. "Accuracy and resolution limits of Kelvin probe force microscopy", Physical Review B 71, 125424, (2005), 9 pages.
Rajapaksa, I. et al. "Image force microscopy of molecular resonance: A microscope principle", Applied Physics Letters 97, 073121, (2010), 3 pages.
Albrecht, T.R. et al. "Frequency modulation detection using high-Q cantilevers for enhanced force microscope sensitivity", J. Appl. Phys. 69 (2), Jan. 15, 1991, 6 pages.
Nowak, Derek et al. "Nanoscale chemical imaging by photoinduced force microscopy", Downloaded from http://advances.sciencemag.org/ on Apr. 8, 2016, 10 pages.

FREQUENCY MODULATION DETECTION FOR PHOTO INDUCED FORCE MICROSCOPY

CROSS-REFERENCE TO RELATED APPLICATION

This application is entitled to the benefit of provisional U.S. Patent Application Ser. No. 62/452,307, filed Jan. 30, 2017, which is incorporated herein by reference.

BACKGROUND

As is well known, atomic-force microscopy (AFM) detection of forces and force gradients via changes in amplitude of a cantilever resonant mode have slow (albeit very sensitive) response in vacuum because of low air damping and high mechanical Q in vacuum.

Conventional Photo-induced Force Microscopy (PiFM) relies on amplitude sensing. The laser light is modulated at a frequency to either directly excite a cantilever resonance, or via mixing with a first excited resonance to excite a second resonance. Either way, the signal is derived from the amplitude of the response, and the speed of response is limited by the Q. In vacuum, the high Q can result in a response time which is slower than desired. For a description of conventional PiFM, see for example Nowak et al., "Nanoscale chemical imaging by photoinduced force microscopy," Science Advances 2, e1501571 (2016), which is incorporated herein by reference.

SUMMARY

An atomic force microscope and method for detecting photo-induced force using the atomic force microscope utilizes light from a photonic source at a tip-sample interface that results in photo-induced force gradient, which is detected by measuring a resonant frequency of a vibrational mode of a cantilever of the atomic force microscope.

An atomic force microscope in accordance with an embodiment includes a cantilever with a probe tip, a photonic source to irradiate a tip-sample interface that results in photo-induced force gradient, a deflection detector to sense vibration of the cantilever, and a signal processing circuitry to measure a resonant frequency of a vibrational mode of the cantilever using the sensed vibration of the cantilever to detect the photo-induced force gradient.

A method for detecting photo-induced force using an atomic force microscope in accordance with an embodiment comprises irradiating a tip-sample interface with light from a photonic source that results in photo-induced force gradient, sensing vibrations of a cantilever of the atomic force microscope, and measuring a resonant frequency of a vibrational mode of the cantilever using the sensed vibration of the cantilever to detect the photo-induced force gradient.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
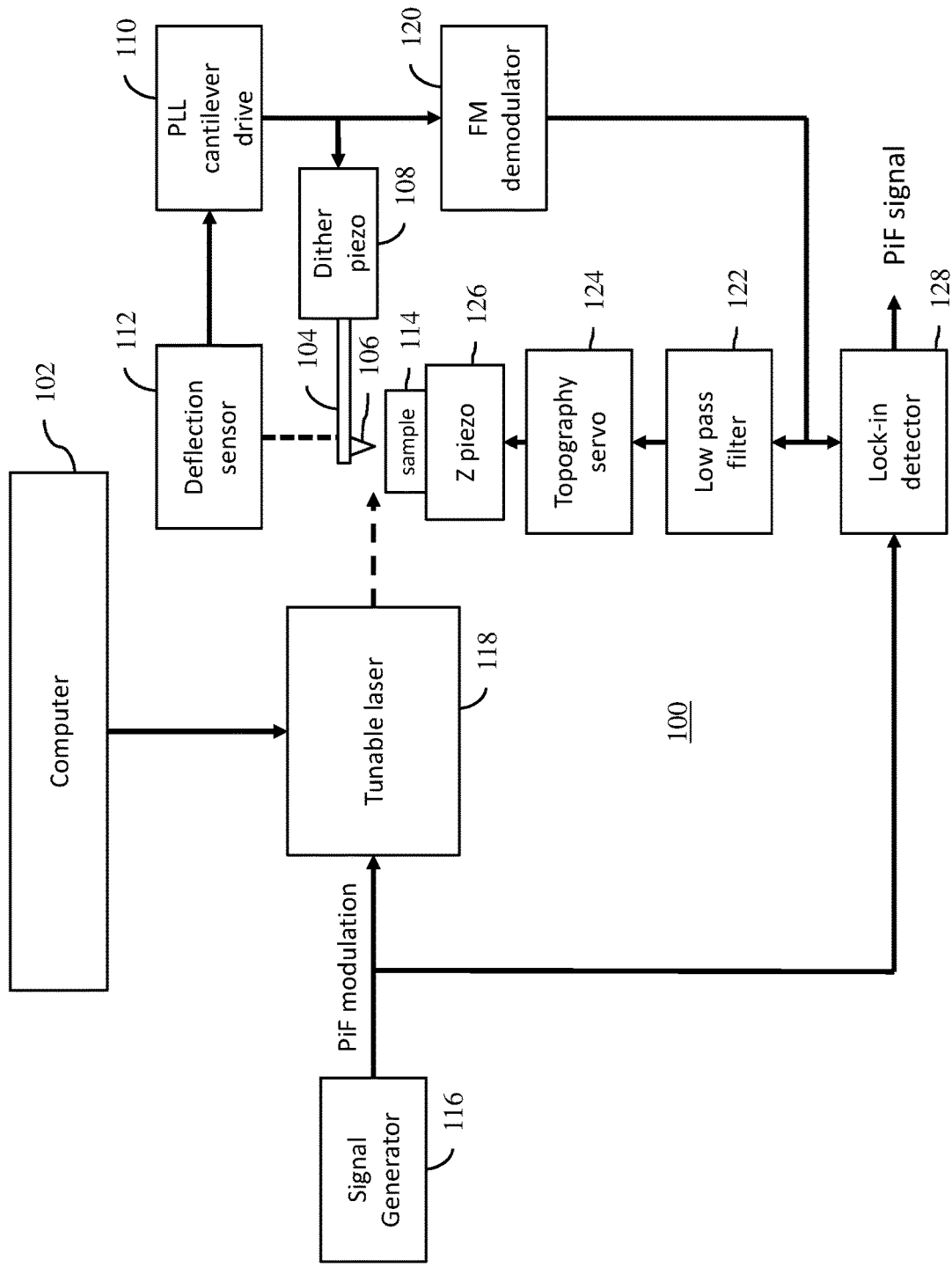
FIG. 1 is a block diagram of an FM-PiFM system in accordance with an embodiment of the invention.

As has been previously shown by Albrecht et al., "Frequency modulation detection using high-Q cantilevers for enhanced force microscope sensitivity," J. Appl. Phys. 69, pp. 668-673 (1991), which is incorporated herein by reference, measuring shifts in the resonant frequency of the cantilever, rather than the amplitude of vibration, circumvents the speed limitation caused by high Q. In fact, not only is it possible to generate a response signal with high speed (limited mainly by the speed of the system used to measure the frequency), but higher Q results in improved signal-to-noise ratio and sensitivity.

In conventional Photo-induced Force Microscopy (PiFM), two separate resonances (two vibrational eigenmodes) of the cantilever are used. An eigenmode of the cantilever is a natural vibration of the cantilever such that various parts of the cantilever move together at the same frequency, where the different parts all move sinusoidally at the same frequency and their amplitudes all increase or decrease in proportion to one another. One of the two modes is used for noncontact or tapping mode generation of a topographical image (normal AFM imaging), and the other mode is used for sensing the photo-induced force (PiF). The PiF is induced by focusing light from a tunable light source at the tip/sample interface. Wavelength-dependent absorption of light occurs in the sample, which gives rise to a change in the net force and force gradient acting between the tip and sample. By modulating the laser either at the sensing mode frequency (i.e., the frequency of the mode being used for PiFM), or preferably at the difference frequency between the frequencies of the two modes being used for topographic sensing and PiFM, the sensing mode for PiFM is excited. In conventional PiFM, the amplitude of cantilever vibration at the PiFM mode is used as the signal indicating the magnitude of the PiF.

When the instrument is operated in noncontact mode, the PiF results in an attractive force with a strong gradient (the force rolls off rapidly with distance from the apex of the tip), and therefore the PiF gradient shifts the resonant frequencies of cantilever vibrational modes downward (i.e., to a lower frequency). The higher the PiF, the higher the gradient, and the greater the magnitude of the frequency shift.

The PiF signal, therefore, can be derived from the frequency shift of a particular mode of the cantilever. It is not necessary to use two cantilever vibrational modes, although doing so is an option.

One challenge with measuring PiF via frequency shift is separating the frequency shift arising from PiF from that arising from the van der Waals force used simultaneously for topographic imaging. This can be accomplished by modulating the laser light (and therefore the PiF) at a frequency above the range of interest for topographic following, but well below the frequency of the mode being used for topographic imaging. The range of interest for topographic following is typically in the order of tens or hundreds of hertz.

For example, if the zeroth mechanical resonance of the cantilever is being used for topographical imaging, and this mode has a resonant frequency of 200 kHz, the laser can be modulated at 1 kHz. If the parameters of the servo loop being used for topographic imaging are set such that the servo bandwidth is well below 1 kHz (typical for fairly slow imaging of at most a few frames per minute) then the height of the cantilever above the sample will not be affected by the PiF, since it is changing too rapidly for the topographic servo system to respond to. The cantilever will be attracted toward the sample in a pulsing fashion, with a repetition rate of 1 kHz. When the tip is attracted toward the sample, it will also experience an increased attractive force gradient in step with the pulsing of the laser, and as a result, the resonant frequency of the cantilever will shift downward with each pulse. Thus, the resonant frequency of the cantilever will be frequency modulated at 1 kHz.

This frequency modulation can be detected in one of two ways. 1) If the mode is driven as a self-oscillator running at the resonant frequency of the cantilever, this self-oscillating cantilever will generate a frequency modulation (FM) modulated waveform. This waveform can be FM detected by a variety of conventional analog (frequency discriminator) or digital (frequency counting or period timing) methods. 2.) If the mode is driven at a fixed frequency (for example, driven near the center frequency of the mode when it is not interacting with the sample), then shifts in frequency will cause phase changes between the driving signal and the actual vibration of the cantilever. As used herein, the term "near" a frequency means +/−10 hertz. This phase can be used as the signal. A variant on this second approach is to use this phase to control a phase locked loop, so that the driving frequency follows the resonant frequency of the cantilever, in which case the frequency of vibration can be FM demodulated to derive the signal.

It should be noted that measuring the frequency provides for faster signal response than measuring the phase. While instantaneous changes in phase are unphysical, instantaneous changes in frequency are allowed. Speed of response will be limited by the speed of the detector used to measure frequency, and by phase noise present in the system.

The FM output signal will contain an AC component at the laser modulation frequency (1 kHz in this example) and the amplitude of this AC signal corresponds to the amplitude of the PiF interaction.

Turning now to FIG. 1, a block diagram of an FM-PiFM system 100, suitable for use in vacuum at high Q, in accordance with an embodiment of the invention is shown. The FM-PiFM system 100 includes a computer 102, which controls various components of the FM-PiFM system and processes the resulting PiF signals for imaging. The FM-PiFM system 100 further includes a cantilever 104 with a probe tip 106, a piezoelectric transducer or a dither piezo 108, a phase locked loop (PLL) cantilever driver 110 and a deflection sensor 112. The dither piezo 108 creates vibrations on the cantilever 104 to make the probe tip 106 oscillate, e.g., at one of the resonant modes of the cantilever, as the probe tip is moved over a sample of interest 114 to image the sample. The dither piezo 108 is driven by the PLL cantilever driver 110, which provides a driving signal to the dither piezo. The PLL cantilever driver 110 is connected to the deflection sensor 112, which optically senses the vibrations of the cantilever 104 using a light source, e.g., a laser diode, and a photodetector, e.g., a photodiode detector (not shown). The PLL cantilever driver 110 generates a driving signal whose frequency tracks changes in the resonance frequency of the cantilever 104 due to force gradients acting between the probe tip 106 and the sample 114, which may include PiF. This frequency tracking is accomplished by a phase locked loop in the PLL cantilever driver 110 that measures the phase of the cantilever vibration relative to its driving signal, and adjusts the frequency of the driving signal to maintain a fixed phase relationship between the driving signal and the cantilever vibration. The cantilever 104 with the probe tip 106, the dither piezo 108, the PLL cantilever driver 110 and the deflection sensor 112 are components commonly found in atomic force microscopes.

The FM-PiFM system 100 further includes a signal generator 116, which provides a PiF modulation signal to a photonic source 118, which in this embodiment is a tunable laser. The PiF modulation signal has a frequency above the range of interest for topographic following (e.g., typically in the tens or hundreds of hertz (Hz)), but well below the frequency of the mode being used for topographic imaging (or the lower mode frequency if multiple modes are being used for topographic imaging). As an example, the frequency of the PiF modulation signal may be in the range of 1 kilohertz (kHz) to 200 kilohertz (kHz). The wavelength of the tunable laser 118 is controlled by the computer 102 so that a range of wavelengths can be swept to produce a spectrum of PiF vs. wavelength. The PiF modulation signal applied to the tunable laser 118 turns on and off the tunable laser so that the tunable laser is on at the frequency of the PiF modulation signal. The beam from the tunable laser is directed to the probe tip/sample interface to produce PiF.

The FM-PiFM system 100 further includes an FM demodulator 120, a low pass filter 122, a topography servo 124, a z piezo or a z-directional piezoelectric transducer 126, and a signal processing circuitry in the form of a lock-in detector or amplifier 128. The FM demodulator 120 receives a tracking signal from the PLL cantilever driver 110 and measures changes in the frequency of the cantilever 104, which includes changes due to PiF. In an embodiment, the FM demodulator 120 generates a signal that changes with respect to voltage when the vibration frequency of the cantilever 104 deviates from a reference voltage. The output signal from the FM demodulator 120 is transmitted through the low pass filter to allow only lower frequency of the signal, which is used to maintain a desired distance between the probe tip 106 and the sample of interest 114. In particular, the low-pass filtered signal is transmitted to the topography servo 124, which controls the z piezo 126 to maintain the desired distance between the probe tip 106 and the sample of interest 114.

The output signal of the FM demodulator 120 is also transmitted to the lock-in detector 128 to detect the PiF signal using the PiF modulation frequency signal from the signal generator 116 as the lock-in reference frequency. The output of the lock-in detector 128 corresponds to the amplitude of the component of the FM demodulator output that is modulated at the PiF modulation frequency. Since the laser is modulated at the PiF modulation frequency, and therefore the PiF is modulated at this frequency, the resonant frequency of the cantilever will be frequency modulated at this frequency, and the FM detector output will contain a component that is modulated at this frequency. The output of the lock-in detector 128 therefore is a signal whose magnitude is proportional to the magnitude of the PiF gradient. The PiF signal can be processed by the computer 102 to generate an image of the sample of interest 114.

Note that in the above discussion, only a single vibrational mode is needed to follow topography and generate a PiFM signal. It is also possible to use two separate modes, so that a PiFM amplitude signal can also be derived. While the response time of this signal will be limited by the cantilever Q, it may be useful to generate this signal alongside that derived from the FM mode described above, allowing the user to look at both signals depending on what type of measurement is desired.

In this two mode approach, the laser is modulated at two frequencies. The first frequency corresponds to conventional PiFM, which is usually the difference frequency between the modes used for topographic sensing and PiF sensing, but may also be the sum frequency of the two modes. In addition, a slower modulation, chosen as above for FM, is applied—for example 1 kHz. With this arrangement, an amplitude PiF signal is generated at the PiFM mode, and an FM PiF signal is generated on both modes. Note, however, that since the PiF mode is not driven (it only responds to PiF), it will have low or even zero amplitude at times, making it impossible to measure its frequency on an ongoing basis. Since the topographic mode is constantly driven, its frequency can be measured at all times, and is therefore preferred for generating the PiF FM signal.

Note that the use of two modulation frequencies can be useful, even if there is no intention to derive a PiF amplitude signal on its own cantilever mode. For example, assume that a laser is only capable of short pulses, but allows a pulse repetition rate up to 10 MHz. The highest effective duty cycle occurs when this pulsing is occurring at the maximum frequency. Therefore, modulating at 10 MHz and 1 kHz would be an effective way to generate a PiF FM signal on the mode being used for topographic imaging. In effect, the rapidly pulsing laser is treated as if it were a CW (continuous wave) source, modulated at the PiF modulation frequency.

Figure 2:
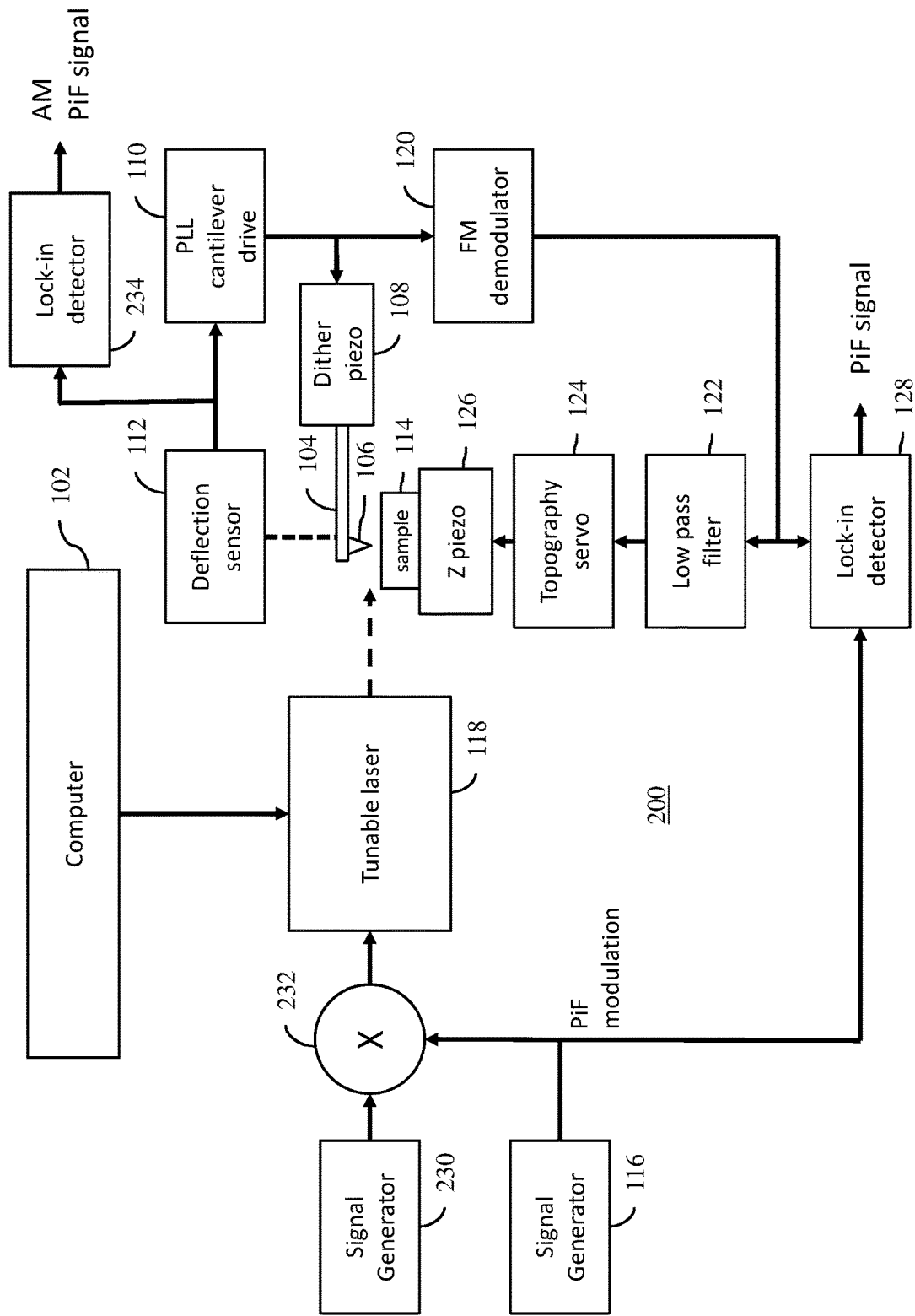
FIG. 2 is a block diagram of an FM-PiFM system in accordance with another embodiment of the invention.

Turning now to FIG. 2, a block diagram of an FM-PiFM system 200, suitable for use in vacuum at high Q, in accordance with another embodiment of the invention is shown. Note that this general approach of modulating an interaction force gradient to cause an FM modulation of a cantilever vibrational mode has been successfully used for interactions other than PiFM. For example, a similar modulation and FM detection scheme is described by Zerweck et al., "Accuracy and resolution limits of Kelvin probe force microscopy," Phys. Rev. B 71, 125424 (2005), which is incorporated herein by reference.

The FM-PiFM system 200 is similar to the FM-PiFM system 100 shown in FIG. 1. The only structural difference between the FM-PiFM system 200 and the FM-PiFM system 100 is that the FM-PiFM system 200 includes a second signal generator 230 and a mixer 232. The second signal generator 230, which is controlled by the computer 102, generates a modulation signal at a sensing mode frequency or a difference frequency between the two modes being used for topographic sensing and PiFM. In an embodiment, the sensing mode frequency is a resonance frequency of the cantilever 104, which is a different resonance frequency of the cantilever than the resonance frequency at which the cantilever is driven. For example, if the cantilever 104 is being driven at its first mode of 200 kHz, then the sensing mode frequency may be its second mode of 1.2 MHz. Using this example, the difference frequency is 1.2 MHz minus 200 kHz or 0.2 MHz, which equals 1 MHz. The modulation signal from the second signal generator 230 is mixed with the PiF modulation signal from the first signal generator 230 at the mixer 232 to produce a mixed modulation signal, which is transmitted to the tunable laser 118 to control its on and off states. The amplitude-based (AM) PiFM signal is generated by detecting the vibration amplitude of the cantilever vibration at the PiFM mode frequency. This is detected by another lock-in detector or amplifier 234 which has a reference signal (not shown) at the sum or difference frequency between the dither frequency and the frequency of the signal generator 230. In this manner, both AM and FM PiFM signals are generated.

The choice of cantilever mode and modulation frequency plays a role in the achievable speed of detection of PiFM using this approach. In the example given above, with a 200 kHz cantilever eigenmode and a 1 kHz modulation frequency, PiFM bandwidth will be less than 1 kHz. In general, choosing a higher modulation frequency, and if necessary, a higher frequency cantilever eigenmode, provides for higher PiFM detection bandwidth and faster PiFM imaging and spectroscopy.

Figure 3:
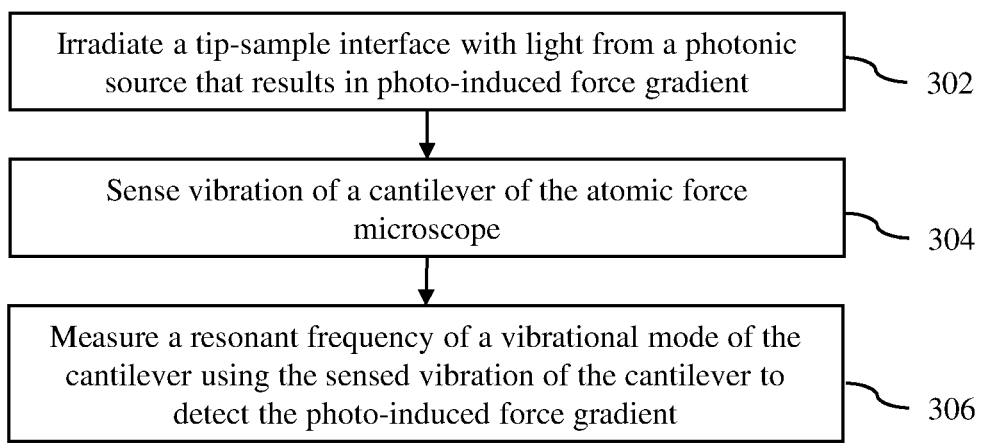
FIG. 3 is a flow diagram of a method for detecting photo-induced force using an atomic force microscope in accordance with an embodiment of the invention.

A method for detecting photo-induced force using an atomic force microscope in accordance with an embodiment of the invention is described with reference to a flow diagram of FIG. 3. At block 302, a tip-sample interface is irradiated with light from a photonic source that results in photo-induced force gradient. In an embodiment, the photonic source, which may be a tunable laser, is modulated at a first modulation frequency using a first modulation signal from a first signal generator. In another embodiment, the photonic source is modulated using a mixed signal of the first modulation signal from the first signal generator and a second modulation signal from a second signal generator. The modulation frequency of the second modulation signal may correspond to a second vibrational mode of a cantilever of the atomic force microscope. Alternatively, the modulation frequency of the second modulation signal may correspond a difference or sum frequency between two vibrational modes of the cantilever.

Next, at block 304, vibration of the cantilever of the atomic force microscope is sensed. The vibration of the cantilever of the atomic force microscope may be sensed using an optical deflection sensor.

Next, at block 306, a resonant frequency of a vibrational mode of the cantilever is measured using the sensed vibration of the cantilever to detect the photo-induced force gradient.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An atomic force microscope comprising:
   a cantilever with a probe tip;
   a photonic source to irradiate a tip-sample interface that results in photo-induced force gradient;
   a deflection detector to sense vibration of the cantilever; and
   a signal processing circuitry to measure a resonant frequency of a vibrational mode of the cantilever using the sensed vibration of the cantilever to detect the photo-induced force gradient.

2. The microscope of claim 1, further comprising a signal generator that generates a modulation signal to modulate the photonic source at a modulation frequency, thereby modulating a photo-induced force, which in turn frequency modulates the resonance frequency of the cantilever.

3. The microscope of claim 2, further comprising:
   a cantilever driver to generate a driving signal to drive the cantilever to vibrate at one of its vibrational resonances, wherein the frequency of the driving signal tracks changes in the resonance frequency of the cantilever; and
   a frequency modulation (FM) demodulator to frequency demodulate the driving signal to derive a photo-induced force signal to detect the photo-induced force gradient.

4. The microscope of claim 3, wherein the cantilever driver tracks the resonance frequency of the cantilever using a phase locked loop which measures the phase of the cantilever vibration relative to its driving signal, and adjusts the frequency of the driving signal to maintain a fixed phase relationship between the driving signal and the cantilever vibration.

5. The microscope of claim 2, further comprising a cantilever driver to generate a driving signal to drive the cantilever at a fixed frequency near a cantilever resonant frequency, and wherein the signal processing circuitry measures the phase of the vibration of the cantilever relative to the fixed frequency of the driving signal to drive a photo-induced force signal to detect the photo-induced force gradient.

6. The microscope of claim 2, wherein the photonic source is modulated or pulsed at second modulation frequency.

7. The microscope of claim 6, wherein the second modulation frequency corresponds to a second vibrational mode of the cantilever.

8. The microscope of claim 6, wherein the second modulation frequency corresponds to a difference frequency or sum frequency between two vibrational modes of the cantilever.

9. The microscope of claim 8, wherein the cantilever is driven to vibrate at a first vibrational mode, and a photo-induced force signal is generated by measuring the amplitude of vibration of a second vibrational mode.

10. A method for detecting photo-induced force using an atomic force microscope comprising:
    irradiating a tip-sample interface with light from a photonic source that results in photo-induced force gradient;
    sensing vibrations of a cantilever of the atomic force microscope; and measuring a resonant frequency of a vibrational mode of the cantilever using the sensed vibration of the cantilever to detect the photo-induced force gradient.

11. The method of claim 10, further comprising modulating the photonic source at a modulation frequency, thereby modulating a photo-induced force, which in turn frequency modulates the resonance frequency of the cantilever.

12. The method of claim 11, further comprising:
driving the cantilever to vibrate at one of its vibrational resonances using a driving signal, wherein the frequency of the driving signal tracks changes in the resonance frequency of the cantilever; and
frequency demodulating the driving signal for the cantilever to derive a photo-induced force signal to measure the photo-induced force gradient.

13. The method of claim 12, wherein tracking of the frequency of the driving signal is accomplished by a phase locked loop which measures the phase of the cantilever vibration relative to its driving signal, and adjusts the frequency of the driving signal to maintain a fixed phase relationship between the driving signal and the cantilever vibration.

14. The method of claim 11, further comprising:
driving the cantilever at a fixed frequency near a cantilever resonant frequency; and
measuring the phase of the vibration of the cantilever relative to the fixed frequency driving signal to derive a photo-induced force signal to measure the photo-induced force gradient.

15. The method of claim 11, further comprising modulating the photonic source at second modulation frequency.

16. The method of claim 15, wherein the second modulation frequency corresponds to a second vibrational mode of the cantilever.

17. The method of claim 15, wherein the second modulation frequency corresponds to a difference frequency or sum frequency between two vibrational modes of the cantilever.

18. The method of claim 17, wherein the cantilever is driven to vibrate at a first vibrational mode, and a photo-induced force signal is generated by measuring the amplitude of vibration of a second vibrational mode.

* * * * *